Figure 1:
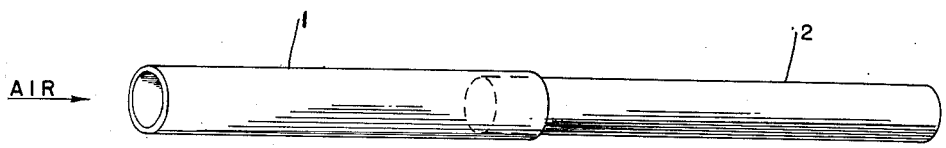

July 26, 1955

J. G. McKINLEY 2,713,885

METHOD OF MAKING FLEXIBLE HOSE

Original Filed April 8, 1948

INVENTOR.
JAMES G. McKINLEY
BY
ATT'Y.

//  # United States Patent Office 2,713,885
Patented July 26, 1955

2,713,885

METHOD OF MAKING FLEXIBLE HOSE

James G. McKinley, Waynesville, N. C., assignor to The Dayton Rubber Company, a corporation of Ohio Original application April 8, 1948, Serial No. 19,798. Divided and this application July 24, 1950, Serial No. 175,520

6 Claims. (Cl. 154—8)

The present invention relates to a method for the manufacture of highly flexible rubber conduit or hose, particularly designed to carry fluids containing suspended particles and being especially adapted to be used for fluids under suction or pressure. This application is a division of application Serial No. 19,798, filed April 8, 1948, entitled Flexible Hose.

Flexible hose or tubing is frequently used for carrying fluids either with or without finely divided material suspended therein. Such uses include transportation of grain or finely divided materials; such as dust by means of carrier gases or suction, as well as the conduction of fluids under pressure as, for example, in carrying compressed air into pneumatic tools. Liquids may also be conveyed in similar tubing. In these applications it is highly desirable to provide hose or conduits having a high degree of strength and flexibility.

An important use of flexible hose is in connection with vacuum cleaners which are used in homes. A conventional type of vacuum cleaner hose is constructed with a spirally wound steel wire placed on the very inside of the hose. This hose is usually made by winding the wire on a steel mandrel which is held in place and caused to revolve. Immediately on top of the wire is placed a single layer of bias cut, rubber coated, square-woven fabric. Next on top of the fabric and equidistant between turns of wire, is placed one strand of a low grade burlap yarn. The assembly described above is then vulcanized and subsequently removed from the mandrel. The vulcanized hose then has an outside braided covering applied. This operation is usually carried out by what is commonly known as a 64 carrier vertical hose braiding machine. Fittings are then applied to each end of the hose for connection to the appliance and to the tool.

The conventional type of hose referred to has numerous disadvantages. In the first place, the interior of the hose has an uneven surface due to the location of the spiral reinforcement which means that the hose becomes subject to clogging and abrasion by particles carried by the fluid. Furthermore, the braided outer surface tends to abrade readily and will, after a period of time, present an unsightly appearance. The wire reinforcement, being positioned on the inner surface of the hose, tends to separate from the rubber or fabric at points of strain. This type of hose also is not as flexible as it should be due to the fabric construction. Furthermore, the use of fabric necessitates the existence of one or more spiral seams and a longitudinal seam which are localities of weak construction. In addition, the fabric construction tends to permit a certain amount of leakage of air.

It is an object of the present invention to provide a simple and efficient method for the manufacture of flexible hose and conduit of the type described herein.

In accordance with the present invention, the improved hose is constructed of two concentric seamless rubber tubes with a wire or other suitable reinforcing material positioned between and held in place by the two tubes. In the manufacture of the hose a wire helix is spun over the inner tube. The outer tube is then positioned over the wire helix and another wire is then wound around the outer tube between the convolutions of the first wire under a tension sufficient to force the outer tube between these convolutions to give the outer surface a helical corrugated structure. The assembly is then vulcanized to form a unitary structure and the outer wire is then removed.

The tubes on which the product is formed may be composed of either natural rubber or synthetic rubber, such synthetic rubber including synthetic rubber-like materials of the type represented by Buna-S, Buna-N, neoprene and the like. In general, such synthetic rubbers are formed by the polymerization of conjugated diolefins or their co-polymerization with other monomers; such as styrene, acrylonitrile, or other unsaturated materials co-polymerizable therewith. The term "rubber" as used herein is intended to and does apply to both natural and synthetic rubbers or mixtures thereof as is well known to the art. The tubes may be entirely unvulcanized or "green" or may be partially or fully unvulcanized and, of course, contain any necessary compounding materials, vulcanizing agents, accelerators and the like, as is well known to the art.

The inner helical reinforcement is preferably disposed between two rubber layers or tubes each of substantially equal thickness, so that in the resulting product the reinforcing member is surrounded by rubber on all sides. After vulcanization the two rubber layers become integrally united with the helical wire being firmly embedded therein.

Figure 2:
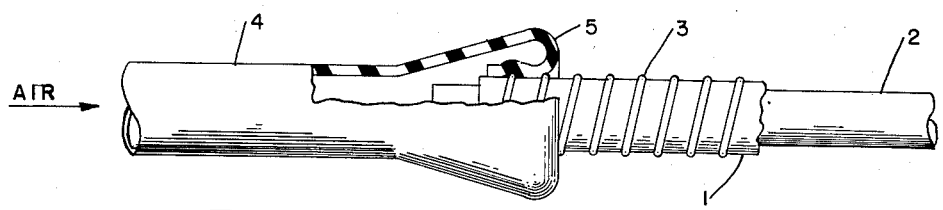
Figure 3:
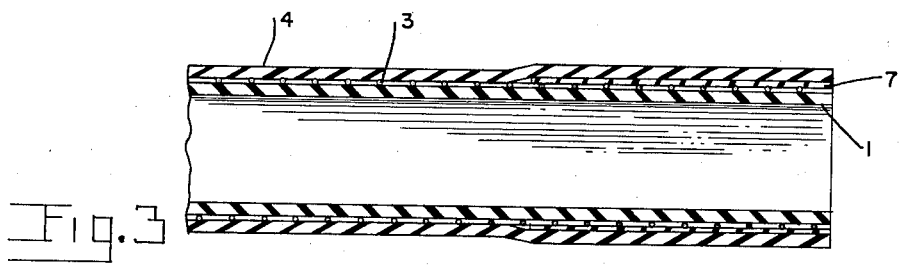
Figure 4:
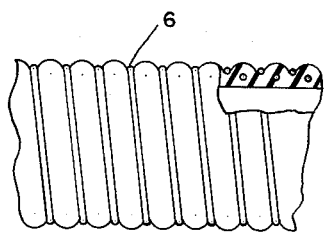
Figure 5:
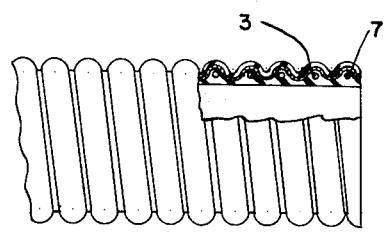

For a further understanding of the invention and the manner of manufacturing the product in question, reference is made to the accompanying drawings in which Figure 1 is a side elevation illustrating a first step in the preparation of the conduit. Figure 2 is a side elevation, partially in cross section, illustrating one mode of applying the outer tube to the wire wound inner tube. Figure 3 is a longitudinal vertical cross section through one end portion of the assembly formed in Figure 2. Figure 4 is a side elevation of a length of tubing, partially in cross section, showing a segment of the assembly of Figure 3 after the outer wire has been wound around the outer tube. Figure 5 is a view similar to that in Figure 4 showing the final product after the removal of the outer wire.

A length of rubber tubing, preferably not cured, of the desired internal diameter, is formed by extrusion or in any desired manner and is cut to the desired length. This tube is then blown or otherwise positioned upon a hollow cylindrical pole or mandrel 2 which conforms to the length of the desired final length of hose. A helix of steel wire 3 is then spun over the tube. Preferably, the wire is applied in open spaced turns. The wire may be galvanized, or may be black or lacquer finish and will have a suitable amount of temper depending on the resiliency required in the final product. For example, the wire may have a diameter of 0.051 in. and may be spun with a ¼ in. spacing. The wire is spun with sufficient tension to firmly engage the tube without cutting into it.

The outer tube 4 is then formed by extrusion or otherwise, and if desired may be given a partial cure. Normally the tube is formed in a flat or collapsed condition and may be semi-cured in this way. The tube is then blown upon a mandrel and the outer surface is buffed and covered with a rubber cement and allowed to dry. The cement covered tube is then blown onto the wire covered tube as shown in Figure 2, in such a manner that in doing so the outer tube is turned inside out so that cement layer will contact the wire. This is accomplished as shown in the figure by turning the edge of the cement-covered surface 5 of the outer tube inward and slipping the turned-in portion over the end of the wire covered inner tube to start the inverting operation. The hose is then blown over the inner member to complete the operation and the resulting product will then have the structure shown in Figure 3.

In an alternative procedure, a green tube may be extruded directly over the wire wound inner tube on the mandrel and then the assembly is partially cured.

Another wire helix 6 of the same type of wire is then spun over the outside cover with the same spacing but is staggered with respect to the turns of the inner helix. Sufficient tension is used so that the outer tube will be forced between convolutions of the inner wire. Since the outer tube has preferably been semicured, this may be accomplished without embedding the wire in the rubber. The assembly is then given a final cure and the product will have the structure shown in Figure 4. Following the cure, the outer wire is removed to give the final product having the structure shown in Figure 5.

An important procedure which is utilized in large-scale manufacture, involves the use of the outer wire which is removed from the product of Figure 4 as the permanent inner reinforcement for use in the procedure described in connection with Figure 2. This means that the wire used in each length of hose actually performs two functions since it is first used for the purpose of wrapping the outer tube and forming convolutions therein in one sequence of operations, after which it is then used as the inner helical reinforcement in forming another length of tubing in another sequence. Although the same wire might be used a number of times as the outer wrap and then discarded, this would involve a certain waste of wire and would fail to have the simplicity of operation provided by the use of the outer wire as the inner reinforcing member. In addition to the economies involved, this step possesses other advantages including the fact that the wire which has been previously used as the outer wrap is more or less preshaped so that it may be readily applied upon the inner tube in the succeeding operation. In actual practice a number of assemblies conforming to Figure 4 would first be prepared and the outer wrapping wire from each of these would then be removed after curing and these lengths of wire then used as the inner reinforcements in an equal number of assemblies undergoing manufacture at the stage shown in Figure 2 and the sequence of operations repeated any desired number of times utilizing the outer wire wrapping from one sequence as the inner reinforcing member in another sequence of steps.

The hose may be made in any desired diameter. In vacuum cleaner hose, for example, the inner tube may have an inside diameter of 1¼ in. with both tubes having a thickness of about 0.040 in.

Where the hose is to be connected to fittings as in the case of vacuum cleaner hose, it is frequently desired that there be somewhat less flexibility at the junction of the hose with the fittings in order to avoid excessive strain at such points. In order to increase flex life at such points, it is desirable to incorporate a short fabric layer 7 near either or both ends of the hose as shown, for example, in Figures 3 and 5. This fabric layer is intended to extend only a minor portion of the length of the hose and generally will be from a few inches to about a foot in length depending on the length of the hose. The fabric layer is applied by winding a suitable fabric in strip form on a bias over the inner wire helix at either or both ends of the tube for the distance desired before positioning the outer tube thereon. Whatever the length of the hose, it is intended that the fabric reinforcement at the ends shall occupy only a minor portion of the total length.

The product made in accordance with the present process is essentially one which is composed entirely of rubber with wire reinforcement, except in cases where the fabric is used at the ends of the hose. The wire reinforcement is entirely surrounded by rubber and the outer surface has a helically convolute structure imparting a high degree of flexibility to the product. The inner surface of the hose is perfectly smooth and offers no resistance to flow with consequent avoidance of abrasion and clogging. The outer surface also being smooth and being formed of rubber, is also more resistant to abrasion. The fact that the hose is constructed of two concentric or rubber seamless tubes minimizes leakage of air and consequently holds vacuum more effectively than conventional hose.

The use of wire as the outer wrapping has numerous advantages since it gives deeper and more uniform corrugations and may be readily removed to leave a smooth and unmarked surface; whereas the use of cord or yarn will leave an impression in the outer tube and will be difficult to remove without also removing some of the outer wrapping. In addition, the wire may be used as the permanent reinforcement in another length of tubing as described herein.

The hose has numerous applications where a high degree of strength and flexibility is required and where smooth inner and outer surfaces are advantageous.

The forms and procedures described herein are for the purpose of illustration and example only and only such limitations should be imposed on the invention as are set forth in the appended claims.

I claim:

1. A method for the manufacture of a flexible conduit having a substantially smooth and continuous inner surface and a substantially smooth and corrugated outer surface which comprises forming an inner rubber tube, applying said inner tube over an elongated mandrel, applying a wire reinforcing member around said inner tube in spaced helical turns, forming a second rubber tube having an interior diameter substantially corresponding to the exterior diameter of the inner tube, applying said second tube over said inner tube and said wire reinforcing member while on said elongated mandrel, winding a second wire member around said outer tube in spaced turns while the superimposed tubes are on said elongated mandrel, said turns being positioned intermediate the turns of the inner reinforcing member, applying sufficient tension to said outer wire to force the outer tube between the turns of the inner reinforcing member and completely surround it, vulcanizing the assembly to integrally unite the inner and outer tubes with the wire reinforcing member firmly embedded therebetween, removing the outer wire wrapping member to leave a substantially smooth and helically corrugated outer surface, and removing the conduit thus formed from said elongated mandrel.

2. A method according to claim 1 in which the outer wire wrapping member which is removed after the vulcanizing operation, is utilized as the inner wire reinforcing member in a succeeding sequence of operations for the manufacture of conduit in the repetition of the steps set forth in claim 1.

3. A method for the manufacture of a flexible rubber conduit having a substantially smooth and continuous inner surface and a substantially smoother and helically corrugated outer surface, which comprises forming an inner rubber tube, positioning said tube over an elongated mandrel, winding said inner tube with a wire reinforcing member in spaced helical turns, forming an outer rubber tube having an internal diameter conforming substantially to the external diameter of the inner tube, applying a layer of rubber cement to the exterior surface of said outer tube, inverting said outer tube so that the cement layer becomes the inner layer of said tube and applying said outer tube with said inner cement layer over said inner tube positioned on said elongated mandrel with said wire reinforcing member thereon, winding said outer layer with a wire wrapping member in spaced helical turns positioned between the turns of said inner reinforcing member at a tension sufficient to force said outer tube between the turns of said inner reinforcing member and completely surround it, vulcanizing the resulting assembly while on said elongated mandrel to integrally unite the inner and outer tubes with said wire reinforcing member firmly embedded therebetween, and removing said outer wire wrapping member to form an outer surface having a smooth corrugated structure, and removing the conduit so formed from said mandrel.

4. A method for the manufacture of a flexible rubber conduit which comprises forming an inner rubber tube and applying it to an elongated mandrel, winding around said inner tube a wire reinforcing member in helically spaced turns, extruding a rubber tube having an inner diameter conforming substantially to the outer diameter of the inner tube directly over said inner tube and said wire reinforcing member while on said elongated mandrel, winding around said outer tube a wire reinforcing member in helically spaced turns applied between the turns of the inner wire member at a tension sufficient to force the outer tube between the turns thereof and completely surrounding it, vulcanizing the resulting assembly to unite said inner and outer tubes with the inner wire reinforcing member firmly embedded therebetween, and removing said outer wire wrapping member, and removing the conduit so formed from said elongated mandrel.

5. A method according to claim 4 wherein the outer tube is partially cured before the outer wire member is applied.

6. A method for the manufacture of wire reinforced hose which comprises forming a first inner tube comprising rubber, positioning said tube on an elongated mandrel, wrapping said tube with a helical wire reinforcing member by winding said wire around said tube in spaced helical turns, applying over said wire a first outer tube comprising rubber, applying to said outer tube a helical wire wrapping member similar to said wire reinforcing member under a tension sufficient to force said outer tube into engagement with said inner tube and said wire reinforcing member, vulcanizing the resulting assembly while on said elongated mandrel to form a unitary structure, removing said helical wire wrapping member from the outer surface of the resulting assembly to form a first length of corrugated hose, removing said hose from said elongated mandrel, forming a second inner tube comprising rubber, positioning said second inner tube on a second elongated mandrel, wrapping said second inner tube with the wire wrapping member removed from the outer surface of the first length of hose to serve as the helical wire reinforcing member in a second length of hose, and applying a second outer tube thereover, wrapping said second outer tube with a wire wrapping member, vulcanizing the assembly, removing the outer wire wrapping member to form a second length of hose, removing said hose from said second elongated mandrel, and repeating the sequence of operations to form additional lengths of hose using the outer wire wrapping member from one length of hose as the inner reinforcement in the next length of hose.

References Cited in the file of this patent

UNITED STATES PATENTS

| | | |
|---|---|---|
| 2,151,307 | Smith | Mar. 21, 1939 |
| 2,231,954 | Scherubel | Feb. 18, 1941 |
| 2,288,391 | Carman | June 30, 1942 |
| 2,321,064 | Broedling | June 8, 1943 |
| 2,482,702 | Billmeyer | Sept. 20, 1949 |
| 2,560,369 | Roberts | July 10, 1951 |
| 2,584,501 | Roberts | Feb. 5, 1952 |
| 2,630,157 | Smellie | Mar. 3, 1953 |